(12) United States Patent
Zheng et al.

(10) Patent No.: US 8,699,490 B2
(45) Date of Patent: Apr. 15, 2014

(54) DATA TRANSMISSION METHOD, NETWORK NODE, AND DATA TRANSMISSION SYSTEM

(75) Inventors: Ruobin Zheng, Shenzhen (CN); Zhongjian Zhang, Shenzhen (CN); Hongyu Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 234 days.

(21) Appl. No.: 13/072,077

(22) Filed: Mar. 25, 2011

(65) Prior Publication Data
US 2011/0170545 A1    Jul. 14, 2011

Related U.S. Application Data

(63) Continuation of application No. PCT/CN2009/074245, filed on Sep. 27, 2009.

(30) Foreign Application Priority Data

Sep. 28, 2008 (CN) .......................... 2008 1 0169530

(51) Int. Cl.
*H04L 12/28* (2006.01)
*H04L 12/58* (2006.01)

(52) U.S. Cl.
USPC ........ 370/392; 370/393; 370/397; 370/395.3; 370/469; 370/352; 370/389; 370/466; 370/359

(58) Field of Classification Search
None
See application file for complete search history.

(56) References Cited

U.S. PATENT DOCUMENTS

| 7,961,739 B2 * | 6/2011 | Perry et al. .................... 370/397 |
| 2002/0114328 A1 * | 8/2002 | Miyamoto et al. ............ 370/389 |
| 2006/0120374 A1 | 6/2006 | Yoshimoto et al. |
| 2008/0317011 A1 * | 12/2008 | Datta et al. .................... 370/356 |
| 2010/0103875 A1 * | 4/2010 | Simonsson et al. ........... 370/328 |

FOREIGN PATENT DOCUMENTS

| CN | 1455597 A | 11/2003 |
| CN | 1482827 A | 3/2004 |
| CN | 101047509 A | 10/2007 |
| CN | 101052030 A | 10/2007 |
| CN | 101119219 A | 2/2008 |
| CN | 101150497 A | 3/2008 |

OTHER PUBLICATIONS

Second Chinese Office Action (Partial Translation); dated (mailed) May 11, 2012; issued in related Application No. 200810169530.3 (Chinese version included) (28 pgs.).

(Continued)

*Primary Examiner* — Ian N Moore
*Assistant Examiner* — Eric H Wang
(74) *Attorney, Agent, or Firm* — Leydig, Voit & Mayer, Ltd.

(57) ABSTRACT

A data transmission method is provided. The method is used to transmit multiple data packets, and includes the following steps. Multiple acquired data packets are mapped to different sessions according to data header information of the data packets, in which each session corresponds to one or more data packets. A data packet is encapsulated into a session message, in which the encapsulated session message includes a session identifier of the session corresponding to the one or more data packets. Multiple session messages belonging to the same session are transmitted to a next network node through at least two tunnels in link layer.

7 Claims, 13 Drawing Sheets

(56) References Cited

OTHER PUBLICATIONS

Cisco—MTU Tuning for L2TP; Document ID: 24320; Jun. 22, 2005 (6 pgs.).
European Patent Communication related to the European search report, pursuant to Rule 62 EPC, the supplementary European search report (Art. 153(7) EPC) and the European search opinion issued in related Application No. 09815624.3-1244; dated (mailed) Jun. 13, 2012 (7 pgs.).
First Chinese Office Action dated (mailed) Aug. 10, 2011, issued in related Chinese Application No. 200810169530.3 Huawei Technologies Co., LTD.
International Search Report from the Chinese Patent Office in International Application No. PCT/CN2009/074245 mailed Jan. 7, 2010.
Written Opinion of the International Searching Authority in International Application No. PCT/CN2009/074245 mailed Jan. 7, 2010.
ITU-T, "Series G: Transmission Systems and Media, Digital Systems and Networks, Digital sections and digital line system—Access networks, Ethernet-based Multi-Pair Bonding", G.998.2, pp. i-ii and 1-13, (Jan. 2005).
ITU-T, "Series G: Transmission Systems and Media, Digital Systems and Networks, Digital sections and digital line systems—Access networks, ATM-based multi-pair bonding", G.998.1, pp. i-iii and 1-30 (Jan. 2005).
ITU-T, "Series G: Transmission Systems and Media, Digital Systems and Networks, Digital sections and digital line systems—Access networks, Multi-pair bonding using time-division inverse multiplexing", G.998.3, pp. i-iv and 1-72 (Jan. 2005).
Risso, et al., "Link Aggregation—IEEE 802.3ad", Based on chapter 8 of M. Baldi, "Switched LAN", McGraw-Hill, ISBN 88-386-3426-2, pp. 1-18, (2002).
Sklower, et al., "The PPP Multilink Protocol (MP)", Network Working Group, rfc1990, pp. 1-22, (Aug. 1996).
Bryant, Ed., et al., "Pseudo wire Emulation Edge-to-Edge (PWE3) Architecture", rfc3985, pp. 1-38, (Mar. 2005).
Richards, et al., "The PPP Bandwith Allocation Protocol (BAP) The PPP Bandwith Allocation Control Protocol (BACP)", rfc2125, pp. 1-22, (Mar. 1997).
DSLhome-Technical Working Group, Technical Report, DSL Forum, TR-069 CPE WAN Management Protocol, pp. 1-109, (May 2004).
DSL Form Working Text, "WT-147 Layer 2 Control Mechanism for Broadband Multi-Service Architecture", pp. 1-52, (Feb. 2008).
Architecture and Transport Working Group, "Technical Report DSL Forum TT-101, Migration to Ethernet-Based DSL Aggregation", pp. 1-101, (Apr. 2006).
Rejection Decision in corresponding Chinese Patent Application No. 200810169530.3 (Sep. 6, 2012).

\* cited by examiner

DATA TRANSMISSION METHOD, NETWORK NODE, AND DATA TRANSMISSION SYSTEM

CROSS-REFERENCE TO RELATED APPLICATIONS

This application is a continuation of International Application No. PCT/CN2009/074245, filed on Sep. 27, 2009, which claims priority to Chinese Patent Application No. 200810169530.3, filed on Sep. 28, 2008, both of which are hereby incorporated by reference in their entireties.

FIELD OF THE TECHNOLOGY

The present invention relates to the field of communications technology, and more particularly to a data transmission method, a network node, and a data transmission system.

BACKGROUND OF THE INVENTION

A conventional user broadband access line is generally in a manner of digital subscriber line (DSL), which is characterized with narrow line bandwidth and a long distance from a user to a central office. With emergence of new services and expansion of user service scale, a user needs higher bandwidth, but the bandwidth provided in a manner of conventional access cannot satisfy needs of the user.

In a process of researching and practicing the prior art, the inventor of the present invention finds that: due to bandwidth limitation, on the premise of original line characteristics, higher bandwidth and transmission performance cannot be provided for the user, and some services (such as high definition Video On Demand) with higher requirements on the transmission performance cannot be provided to the user, which reduces service experience of the user. For example, for one video stream requiring the bandwidth of 6M for playing, an xDSL line can only provide the bandwidth of 4M at most due to limitation of such factors as distance.

SUMMARY OF THE INVENTION

The embodiments of the present invention provide a data transmission method, a network node, and a data transmission system, which can increase network transmission bandwidth.

In an embodiment, the present invention provides a data transmission method. The method is used to transmit multiple data packets, and includes the following steps:

Multiple acquired data packets are mapped to different sessions according to data header information of the data packets, in which each session corresponds to one or more data packets.

A data packet is encapsulated into a session message, in which the encapsulated session message includes a session identifier of the session corresponding to the one or more data packets.

Multiple session messages belonging to the same session are transmitted to a next network node through at least two tunnels in link layer.

In an embodiment, the present invention provides a data transmission method, which includes the following steps:

Session messages are received through at least two tunnels, in which each received session message is encapsulated with a data packet and a session identifier.

The session messages are categorized according to the session identifiers of the received session messages.

Data packets in the session messages belonging to the same session are reassembled.

In an embodiment, the present invention provides a network node, which includes a data header information acquiring unit, a data packet mapping unit, a message encapsulating unit, and a data transmitting unit.

The data header information acquiring unit is configured to acquire data header information of a data packet.

The data packet mapping unit is configured to map an acquired data packet to one session of multiple different sessions according to the data header information of the data packet acquired by the data header information acquiring unit.

The message encapsulating unit is configured to encapsulate the acquired data packet into a session message, in which the encapsulated session message includes a session identifier of a session corresponding to the one or more data packets.

The data transmitting unit is configured to transmit multiple session messages belonging to the same session through at least two tunnels in link layer.

In an embodiment, the present invention provides a network node, which includes a data receiving unit, a data categorizing unit, and a data processing unit.

The data receiving unit is configured to receive session messages through at least two tunnels in link layer, in which each received session message is encapsulated with a data packet and a session identifier.

The data categorizing unit is configured to categorize the session messages according to the session identifiers of the received session messages.

The data processing unit is configured to reassemble data packets in the session messages belonging to the same session.

In an embodiment, the present invention provides a data transmission system, which includes a sending network node and a receiving network node.

The sending network node is configured to map multiple acquired data packets to different sessions according to data header information of the data packets, in which each session corresponds to one or more data packets; encapsulate a data packet into a session message, in which the encapsulated session message includes a session identifier of a session corresponding to the one or more data packets; and transmit multiple session messages belonging to the same session to a next network node through at least two tunnels in link layer.

The receiving network node is configured to receive session messages through at least two tunnels, in which each received session message is encapsulated with a data packet and a session identifier; categorize the session messages according to the session identifiers of the received session messages; and reassemble data packets in the session messages belonging to the same session.

The embodiments of the present invention are used to transmit multiple data packets, which includes the following steps. Multiple acquired data packets are mapped to different sessions according to data header information of the data packets, in which each session corresponds to one or more data packets. A data packet is encapsulated into a session message, in which the encapsulated session message includes a session identifier of a session corresponding to the one or more data packets. Multiple session messages belonging to the same session are transmitted to a next network node through at least two tunnels in link layer. On the basis of satisfying the requirement of an original line distance, multiple data tunnels are adopted, and thus network transmission bandwidth is increased, high quality and high bandwidth services are supported, thereby enhancing service experience of a user.

DETAILED DESCRIPTION OF THE EMBODIMENTS

According to embodiments, the present invention provides a data transmission method, a network node and a data transmission system, which are used to transmit multiple data packets. The data transmission method, the network node, and the data transmission system according to the present invention are illustrated in detail in the following.

For the data transmission method according to an embodiment of the present invention, the lines for a data sender and a data receiver to transmit date are bonded in a data transmission process by using the method according to the present invention. By dynamically allocating multiple tunnels in link layer between the sender and the receiver, bandwidth is reasonably utilized, and efficiency of network transmission is increased.

A specific process of sending data by the sender includes the following steps:

Multiple acquired data packets are mapped to different sessions according to data header information of the data packets, in which each session corresponds to one or more data packets.

A data packet is encapsulated into a session message, in which the encapsulated session message includes a session identifier of the session corresponding to the one or more data packets.

Multiple session messages belonging to the same session are transmitted to a next network node through at least two tunnels in link layer.

A process of receiving data by the receiver includes the following steps:

Session messages are received through at least two tunnels, in which each received session message is encapsulated with a data packet and a session identifier.

The session messages are categorized according to the session identifiers of the received session messages.

Data packets in the session messages belonging to the same session are reassembled.

A data transmission method according to the present invention is described in detail. Processing details concerned with specific technologies should be understood as examples of implementing the present invention, which do not limit the present invention.

Figure 1:
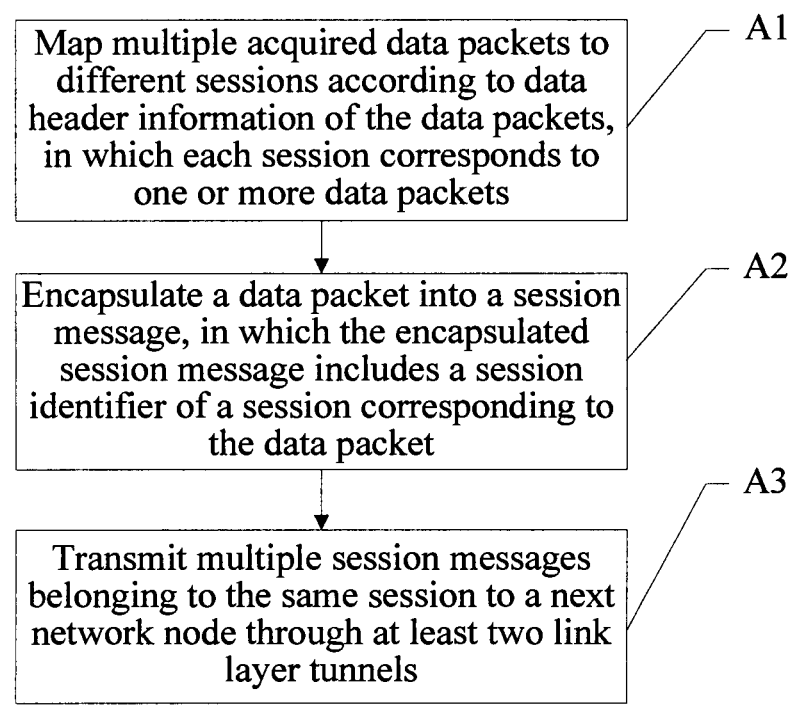
FIG. 1 is a flow chart of a data transmission method according to a first embodiment of the present invention.

In a first embodiment, FIG. 1 is a flow chart of a data transmission method. As shown in FIG. 1, the method includes the following steps:

Step A1: Map multiple acquired data packets to different sessions according to data header information of data packets, in which each session corresponds to one or more data packets.

In this embodiment, the data packet can be a link layer data packet or a network layer data packet.

The data packet can be an uplink data packet, and can also be a downlink data packet. Regardless of whether it is the uplink data packet or the downlink data packet, the data packet is buffered in this embodiment; and data header information is acquired. The data header information can include such information as source MAC, destination MAC, source IP, destination IP, and protocol type. A source MAC, a destination MAC, a source IP, a destination IP, and a protocol type are referred to as a quintuple.

Step A2: Encapsulate a data packet into a session message, in which the encapsulated session message includes a session identifier of a session corresponding to the one or more data packets. It can be understood that, a process of encapsulating the data packet is a process of adding a session identifier.

For example, 100 data packets are mapped to 10 different sessions, and each session corresponds to one or more data packets.

A session dividing rule can be a rule based on the quintuple, and the session can also be divided according to other information of the data packets. According to this embodiment, a session can be divided by analyzing the data header information of the data packets. A specific analysis process can be performed in a variety of regular implementation manners, which do not limit the present invention.

The added session identifier denotes a session to which the data packet is divided; and the session identifier can be provided for a network node requiring reassembling the data packets to reassemble data packets in the session messages belonging to the same session.

The encapsulating of the data packet into the session message includes: adding an extension header (Extended Sublayer) to the data packet. The session identifier is encapsulated in the Extended Sublayer or encapsulated in label information outside the Extended Sublayer.

In this embodiment, by adding the Extended Sublayer, the session identifier is carried in the Extended Sublayer. It can be understood that, the session identifier can also be carried by reserving a field in the data packet, and a specific manner of carrying the session identifier does not limit the present invention.

Specifically, for example, if the data packet is a link layer data packet, a process of adding an Extended Sublayer field to a data packet of each session includes: adding the Extended Sublayer or adding the Extended Sublayer and the label information outside the Extended Sublayer to a frame header of a link layer of the data packet; or, adding the Extended Sublayer or adding the Extended Sublayer and the label information outside the Extended Sublayer to a message header of a network layer of the data packet.

If the data packet is a network data packet, a process of adding the Extended Sublayer to a message of each session includes: adding the Extended Sublayer or adding the Extended Sublayer and the label information outside the Extended Sublayer to a frame header of the network layer of the data packet.

It can be understood that, further, for data packets of some sessions, multiple data packets belonging to the same session are required to be strictly sorted. In this case, sequence number information denoting data packet sorting can be carried in the Extended Sublayer, so that a network node having received a data packet can reassemble data packets in the session messages belonging to the same session according to the sequence number information when it is required to reassemble the data packets. For example, in a process of reassembling data packets in the session messages belonging to the same session, the data packets are sorted by sequence number.

If a sum of length of the data packet and length of the Extended Sublayer to be added exceeds data packet length transmitted by a network, the data packet is divided and then the Extended Sublayer is added. The added Extended Sublayer carries division information, and a field of the division information is used to reassemble the data packets.

Step A3: Transmit multiple session messages belonging to the same session to a next network node through at least two tunnels in link layer.

A specific data packet transmission process can include the following steps:

A transmission tunnel is allocated for the data packet according to tunnel bandwidth utilization.

A tunnel header of the transmission tunnel is encapsulated for the data packet.

A data packet of the encapsulated tunnel header is sent to a next network node through a network.

It can be understood that, the process of encapsulating the tunnel header and the process of encapsulating the Extended Sublayer do not have an absolute sequence, and what is emphasized here is that one data packet can encapsulate one session identifier and one tunnel header. The session identifier is used for an opposite end to reassemble data packets in the session messages belonging to the same session after receiving the data, and the tunnel header is used to indicate a link layer tunnel through which the data packet is sent.

It can be understood that, before step A3, the method can include the following steps:

It is judged whether bandwidth of one data channel of the at least two data transmission channels is sufficient to transmit multiple data packets corresponding to the same session. If sufficient, the multiple data packets are transmitted through the one data channel. In this way, when the bandwidth satisfies requirements, one data channel can be selected to transmit the data packets of the same session as much as possible, so that it is easier for the receiver to process when the receiver integrates and reassembles data.

It can be understood that, there may further be a variety of processes of transmitting data through multiple tunnels, which specifically do not limit the present invention. The data packets of the same session only need to be broken up, and then be transported to the opposite end through multiple tunnels in link layer, and an opposite end device recovers the data packets.

The first embodiment of the present invention is used to transmit multiple data packets, which includes the following steps. The multiple acquired data packets are mapped to the different sessions according to the data header information of the data packets, in which each session corresponds to one or more data packets. The data packet is encapsulated into the session message, in which the encapsulated session message includes the session identifier of the session corresponding to the one or more data packets. The multiple session messages belonging to the same session are transmitted to the next network node through the at least two tunnels in link layer. On the basis of satisfying the requirement of an original line distance, multiple data tunnels are adopted, and thus network transmission bandwidth is increased, high quality and high bandwidth services are supported, thereby enhancing service experience of a user.

Figure 2:
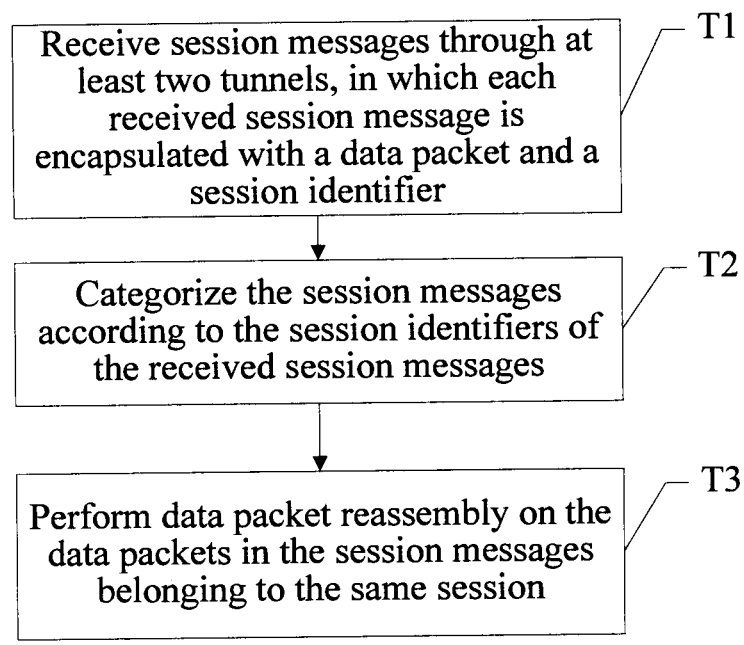
FIG. 2 is a flow chart of a data transmission method according to a second embodiment of the present invention.

In a second embodiment, FIG. 2 is a flow chart of a processing after the receiver receives, the data transmitted by the sender in a data transmission method according to the first embodiment of the present invention. As shown in FIG. 2, the method includes the following steps:

Step T1: Receive session messages through at least two tunnels. Each received session message is encapsulated with a data packet and a session identifier.

Step T2: Categorize the session messages according to the session identifiers of the received session messages.

Step T3: Perform data packet reassembly on the data packets in the session messages belonging to the same session.

It can be understood that, in a case that data packets of a session have a strict sequence requirement, an Extended Sublayer of the data packet further includes sequence number information of the data packet.

A process of reassembling data packets in the session messages belonging to the same session can further include the following steps:

A sequence of data packets of the same session is restored according to the sequence number information; and data packet reassembly is performed on the data packets whose sequence is restored.

It can be understood that, after step T3, the method can further include the following step. Extended Sublayer information in the combined data packet is deleted. Following illustrates the embodiment of the present invention in detail in connection with a specific scenario.

A remote gateway (RG) of a certain user accesses to an access node (AN) device of a provider network through two uplink access lines each. A bonding (MUX/DeMUX) module of a network side locates on an IP edge node (that is, IP Edge), and an MUX/DeMUX module of a user side locates on the RG. The modules bond two uplink port lines of the RG.

Two provider backbone transport (PBT) tunnels (that is, a link layer tunnel is a PBT tunnel in this example) are configured between the RG and the IP Edge, and the two PBT tunnels are identified with VID(1)/MAC_Y and VID(2)/MAC_Y respectively, where VID is a virtual local area network identifier (VLAN Identifier), 1 within round brackets is a value of the identifier, and Y behind MAC is a value of MAC. The user is bonded with the identifier MAC_X of the RG as an identifier, that is, the IP Edge bonds encapsulating tunnels having same source MAC_X together. Such information as service encapsulating (Payload) information, line rate, access line identifier, and interleaving and delay of the RG can be notified to the IP Edge through TLV of a VSA item defined by TR101.

Figure 3:
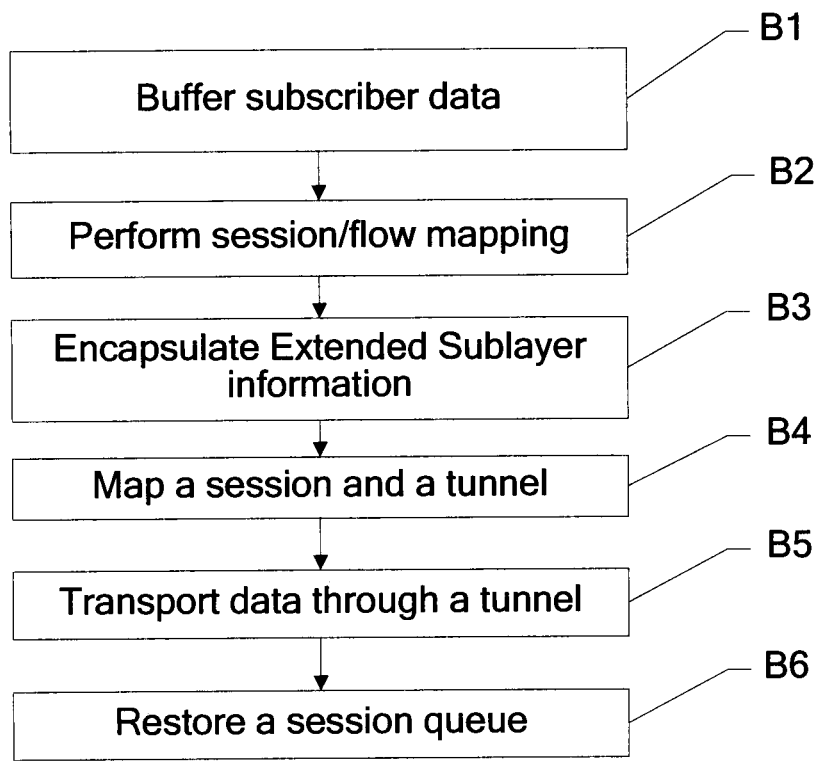
FIG. 3 is a flow chart of a data transmission process in a specific application scenario according to an embodiment of the present invention.

FIG. 3 is a flow chart of a data transmission process according to an embodiment of the present invention. As shown in FIG. 3, the process includes the following steps:

Step B1: Buffer user data.

An RG receives an uplink data packet from a user host or network, and buffers the uplink data packet. The buffered data packet can be a layer 2 data packet, and can also be a layer 3 data packet. In a general case, a layer 2 refers to a link layer, and a layer 3 refers to a network layer.

For example, in this example, the RG receives data sent to an address IP_A from a host with an address IPX1 and data sent to an address IP_B from a host with an address IPX2 separately. Because the RG has a Network Address Translator (NAT) function, a source MAC and a source IP of a data packet are changed into MAC_X and IP_X of the RG respectively, and a destination MAC is changed into an address MAC_Y of the IP Edge. By carrying Client Virtual Local Area Network (C VLAN) identifier information CVLAN_A and CVLAN_B separately, the RG buffers data of the layer 2 or data of the layer 3.

Step B2: Perform session/flow mapping.

The buffered data is mapped into different sessions according to data header information (such information as IP, MAC, protocol type, TCP/UDP port, and VLAN). A session mapping rule can be set according to user requirements.

In this example, the sessions are divided with a quintuple of a source MAC, a destination MAC, a source IP, a destination IP, and a protocol type. According to the received buffered data header information, the data packets can be mapped into two types of session, that is, sessions having destination addresses being IP_A and IP_B respectively.

Step B3: Encapsulate Extended Sublayer information.

According to service information of tunnel encapsulating, related information is mapped to a Flag field of an Extended Sublayer. Continuous sequence numbers are allocated to frames of the same session, and an FRG field is set according to sequence number information. If a K bit is set to 1, one unique session identifier (ID) value is allocated to each session, which is set in a Key field.

If a size of a certain data block with the addition of such information as encapsulating header exceeds a size of a Maximum Transmitting Unit (MTU) allowed by a network, it is needed to slice the data block. A sliced fragment can set the FRG field of the Extended Sublayer to 01, 10, 11 and so on by sequence, and is allocated with a continuous sequence number. If a size of several continuous data blocks in the same session with the addition of such information as encapsulating header does not exceed the size of the MTU allowed by the network, the several continuous data blocks can encapsulate one Extended Sublayer only.

Session IDs of Key1 and Key2 are allocated to two sessions respectively. In this example, each session is divided into 9 fragments with continuous sequence numbers.

In the embodiment of the present invention, the Extended Sublayer is added in a transmitted data packet. There may be a variety of manners of adding the Extended Sublayer, and following illustrates them in detail.

The Extended Sublayer information can be set between tunnel header information and user data, and can also be set between user data link layer (layer 2 data header) information and network layer information in the tunnel header information, scenarios of which are shown in Tables 1 and 2 respectively. The Extended Sublayer between the tunnel and the user data is recommended, which has a wide application range, and more utilizes buffered data.

TABLE 1

| Tunnel | Extended Sublayer | Fragment Data |
| --- | --- | --- |

TABLE 2

| Tunnel | Layer 2 Head | Extended Sublayer | Fragment Data |
| --- | --- | --- | --- |

A format of the Extended Sublayer is shown in Table 3, which includes such information as sequence number and FRG.

TABLE 3

| 0 | 1 | 2 | 3 | 4 | 5 | 6 | 7 | 8 | 9 | 10 | 11 | 12 | 13 | 14 | 15 | 16-31 |
| --- | --- | --- | --- | --- | --- | --- | --- | --- | --- | --- | --- | --- | --- | --- | --- | --- |
| 0 | | | K | Flags | | | | FRG | | | Length | | | | | Sequence Number |
| KEY | | | | | | | | | | | | | | | | |

0 (0-2 bit): a reserved field, a value of which is 0.

K (bits 3): whether a KEY field exists. If it is set to 1, the KEY field exists. A MUX/DeMUX module of a receiving end can distinguish different sessions according to a value of the KEY. If it is set to 0, the MUX/DeMUX module of the receiving end can be mapped (such as quintuple mapped) into different sessions according to a session configuration.

Flags (bits 4 to 7): to be decided according to a payload.

FRG (bits 8 and 9): to be used to segment the payload. For example, 00 denotes that an entire payload is in one signaling packet; 01 denotes that a first fragment is carried; 10 denotes that a last fragment is carried; and 11 denotes that an intermediate clip of a fragment is carried. If the payload is not segmented, it can be used for a Flags identifier.

Length (bits 10 to 15): if the payload is Ethernet data, the field is used to indicate length of a padding content in the payload. If data length (length of fragment data and the Extended Sublayer) within the tunnel is smaller than 64 k, the field indicates the data length within the tunnel. If data length is not smaller than 64 k, it is set to 0.

Sequence number (Bits 16 to 31): 16 bits cyclic unconformable data without including 0.

Key (Bits 32 to 63): to be used to distinguish different sessions in one tunnel.

Some data does not require a strict frame sequence. For example, some applications on Ethernet do not require a strict Ethernet frame sequence. Even though the applications have a sequence requirement for data, a data sequence can also be restored through functions of a high layer, such as Transmission Control Protocol (TCP), and Real-time Transport Protocol (RTP). In a case that the frame sequence has no strict requirement, the FRG field can be set to 00, and sequence number fields of the Extended Sublayer are all set to 0. In this way, frames are not sorted any more. If the frame sequence has a sequence requirement, the FRG field and the sequence number fields are not all 0. The Extended Sublayer information is encapsulated by default within the tunnel. The data can be processed according to information borne within the tunnel, and according to the Extended Sublayer information. Specific encapsulating of a variety of service information can refer to a Pseudowire Emulation Edge to Edge (PWE3) workgroup content of the IETF standard.

A tunnel Extended Sublayer adopted by the present invention adds a Key field, the Key field is used to identify different sessions of the same user, and has a format similar to an IETF PWE3 control word. The present invention establishes a tunnel in a manner of static configuration, and a tunnel based on an Ethernet layer 2 session has default Extended Sublayer information. Content borne within the tunnel may obtain information through interaction between a network-side bonding unit and an IP Edge (such as BRAS). In the present invention, multiple tunnels of one bonded user may transport content of one session simultaneously, and different sessions may be encapsulated within the same tunnel. The Extended Sublayer is not dynamically negotiated, but is implemented in a manner of having the Extended Sublayer by default.

Step B4: Map a session and a tunnel.

Each tunnel may know a size of uplink bandwidth according to uplink line state information, and each session is mapped onto different tunnels according to state information of a line at which a tunnel locates. Only when a rate of one session data is large, and one tunnel is not sufficient to transport an entire session, the data of one session is transported in multiple tunnels. A mapping relation between a session and a tunnel can be set.

In this example, the session Key1 is mapped to the tunnel VID(2)/MAC_Y. The session Key2 is mapped to VID(2)/MAC_Y, but tunnel bandwidth is not sufficient to transport the session. In this way, session information is mapped continuously into the tunnel VID(2)/MAC_Y, and transported through two tunnels simultaneously.

Step B5: Transport data through tunnels.

The RG adds a corresponding tunnel header to data transported by different tunnels separately, and a device on the tunnel performs label mapping according to tunnel information.

The RG adds tunnel header information of MAC_X, VID (1), MAC_Y to one tunnel and MAC_X, VID(2), MAC_Y to the other tunnel. The AN is mapped into different VIDs according to the source MAC_X, the destination MAC_Y, and tunnel information of the VID being VID(1) and VID(2) each, and transported to a next node.

Step B6: Restore a session queue.

After removing tunnel header information, the IP Edge forms different sessions according to a value of the Key field of the Extended Sublayer for data within a tunnel from the same user (user information is identified according to the configuration). The Extended Sublayer information is removed, and data of the same session is sorted according to the sequence number information. If the Key field is not present, data frames needs to re-map a session into a corresponding queue according to the session configuration, so as to be sorted. If the received FRG field is set to 01, data which is received until the FRG field is set to 10 is combined according to sequence numbers.

The IP Edge bonds data from the same user (MAX_X). A sequence of different sessions is formed according to Key1 and Key2, and session data is sorted by sequence number of each session. If a fragment exists, data information is restored according to the sequence numbers and the FRG field. Parameter information of encapsulating data is restored according to Flag information.

Step B7: Forward data continuously on the uplink direction.

Data having a packet sequence being restored is mapped into information of a provider according to related information of a packet and a tunnel, and the data is sent to a network.

CVLAN_A and CVLAN_B of a user are mapped into S-VLAN information of the provider according to the configuration respectively, and MAC information of the user can also be mapped according to MAT.

In this embodiment, an uplink process of data is described. It can be understood that, a downlink process of data is symmetrical with the uplink process, and their technical implementation manners are the same.

Following exemplifies protocol stacks in a process of implementing data transmission according to embodiments of the present invention.

Figure 4:
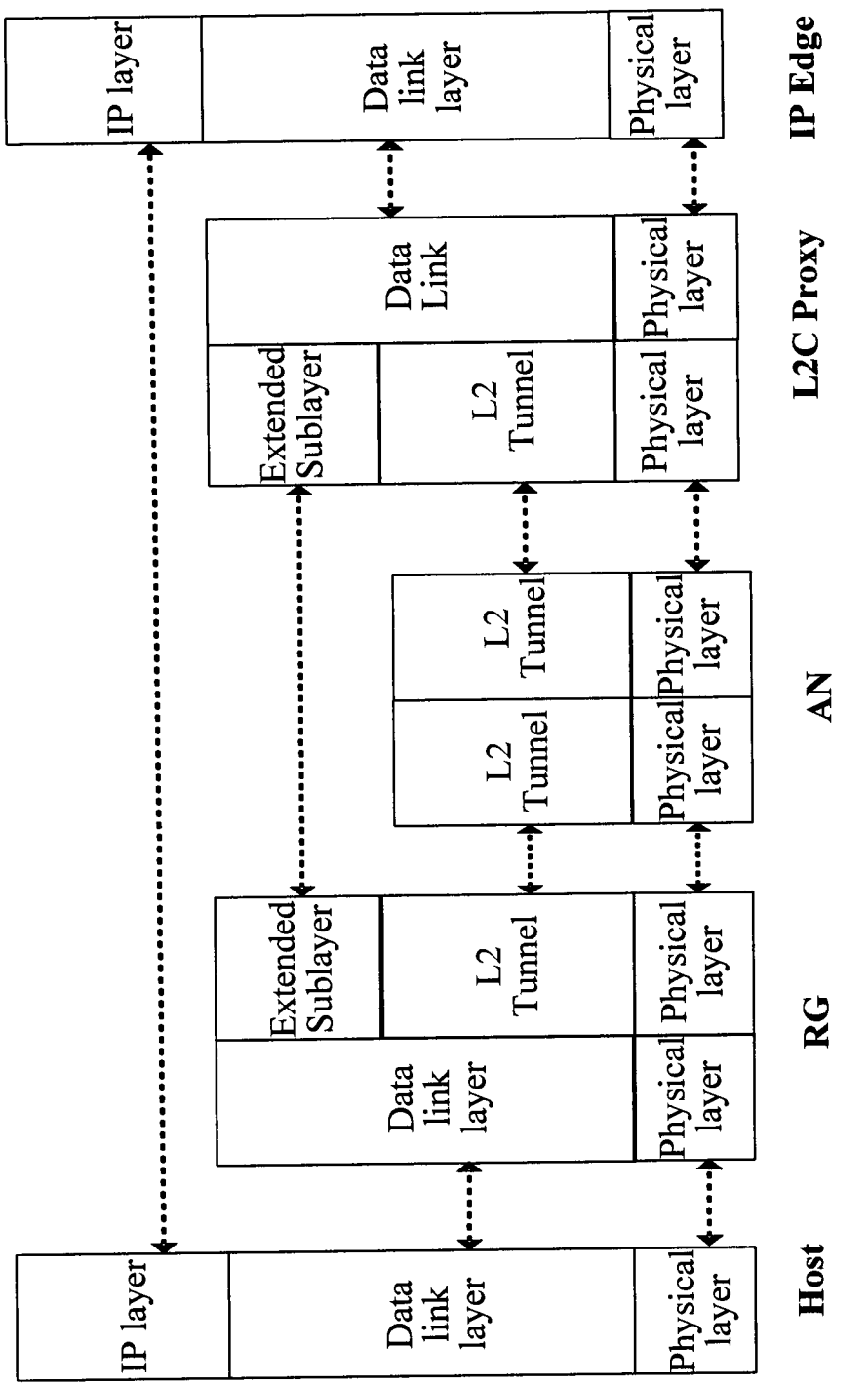
FIG. 4 is a schematic diagram of a protocol stack of layer 3 data bearer in a process of implementing data transmission according to an embodiment of the present invention.

As shown in FIG. 4, a tunnel is established by an RG and an L2C Proxy, which provides a protocol stack of layer 3 data bearer. An Extended Sublayer locates between network layer data and layer 3 data, and can separate, reassemble and sort the network layer data. Addition and separation of the Extended Sublayer are performed on a device RG at which a user-side MUX/DeMUX unit locates and a device L2C Proxy at which a network-side MUX/DeMUX unit locates respectively. Data with the Extended Sublayer is encapsulated with layer 2 tunnel (L2 Tunnel) header information. An encapsulated tunnel can be in a form of MAC-in-MAC, and can also be a tunnel in such manners as PBT and GMPLS. The L2C Proxy needs to restore the network layer data for data received within the L2 Tunnel according to Extended Sublayer information, and be mapped into information (such as VLAN and MAC information) corresponding to a provider according to the user information. The L2C Proxy in a downlink direction is mapped onto a corresponding user according to network layer information and data link layer information, and allocates user data transported in each user tunnel according to access line state information.

Figure 5:
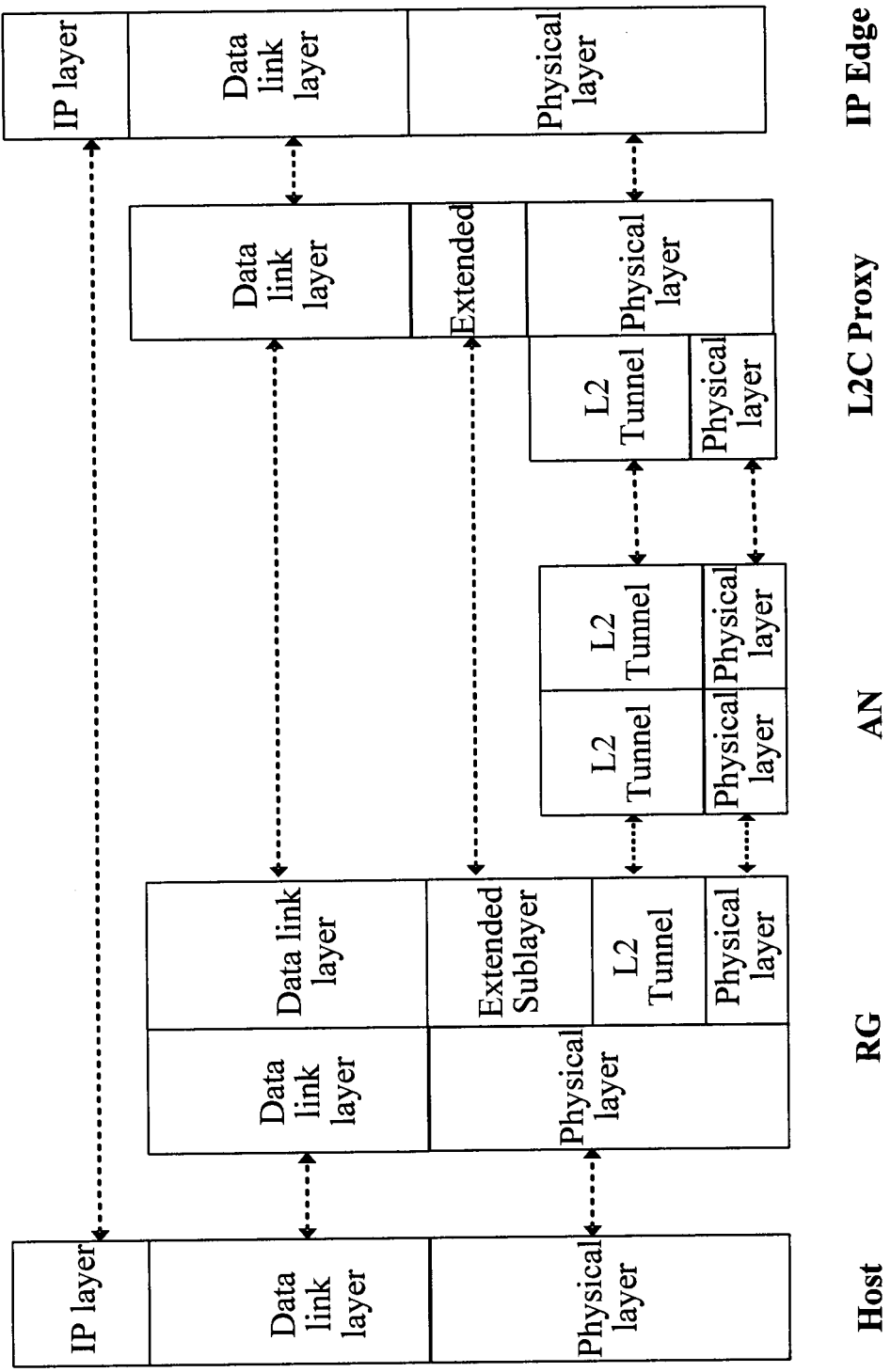
FIG. 5 is a schematic diagram of a protocol stack of layer 2 data bearer in a process of implementing data transmission according to an embodiment of the present invention.

As shown in FIG. 5, a tunnel is established by an RG and an L2C Proxy, so as to provide a protocol stack of layer 2 data bearer. The tunnel adds the Extended Sublayer information to layer 2 data, and separates, reassembles and sorts frames of a data link layer. The L2C Proxy needs to restore a frame sequence for user data received within an L2 Tunnel according to an Extended Sublayer, and map header information of the data link layer into information (such as VLAN and MAC) corresponding to a provider according to user information.

Figure 6:
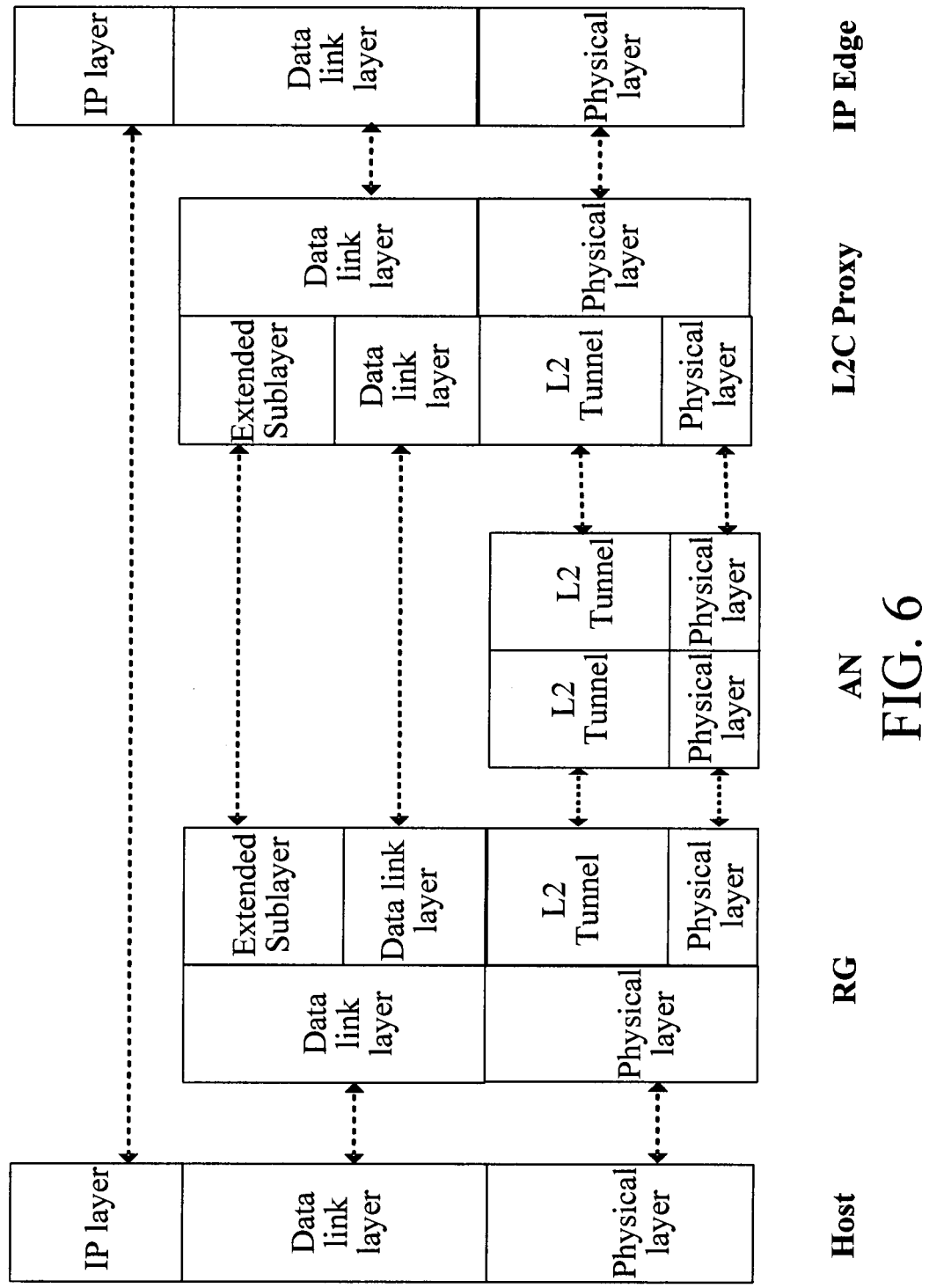
FIG. 6 is a schematic diagram of another protocol stack of layer 2 data bearer in a process of implementing data transmission according to an embodiment of the present invention.

As shown in FIG. 6, for a tunnel that provides layer 2 data bearer, an Extended Sublayer can also be added between a data link layer and a network layer in an embedded manner. An L2C Proxy needs to map header information of the data link layer received within an L2 Tunnel into information (such as VLAN and MAC) corresponding to a provider according to user information, restore a network layer data packet sequence according to an embedded Extended Sublayer, and add mapped layer 2 information. The L2C Proxy in a downlink direction is mapped onto a corresponding bonded user according to network layer information and data link layer information. After adding the Extended Sublayer, the L2C Proxy allocates user data into each tunnel according to access line state information.

Figure 7:
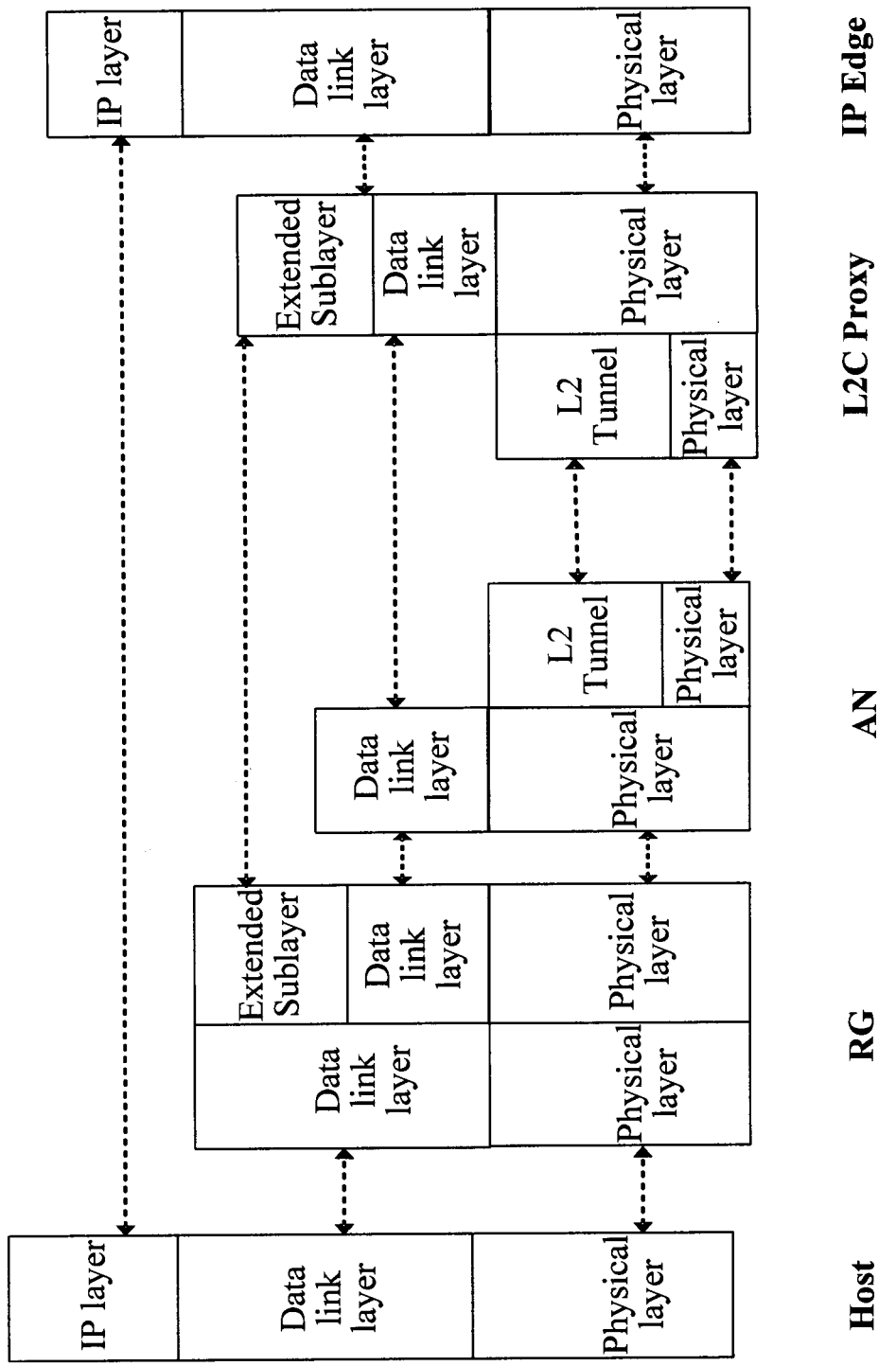
FIG. 7 is a schematic diagram of a still another protocol stack of layer 2 data bearer in a process of implementing data transmission according to an embodiment of the present invention.

FIG. 7 is a schematic diagram of a protocol stack of layer 2 data bearer. An AN and a device L2C Proxy at which a network-side MUX/DeMUX module locates establish a tunnel to provide the layer 2 data bearer. An RG adds Extended Sublayer information to a user message of a layer 3, and forwards it to the AN through a layer 2 header. Through an L2 Tunnel, the AN transports user frames received from a physical port of a bonded user onto the device L2C Proxy at which the network-side MUX/DeMUX module locates. Among the RG, the AN, and the L2C Proxy, such information as MAC and VLAN is exchanged through data link information of a layer 2. The protocol stack is similar to the form in FIG. 6, but the tunnel is established on the AN and the L2C Proxy.

Following provides multiple application scenarios according to embodiments of the present invention.

One user may access to a network through one or more lines. In this way, a case that multiple physical ports correspond to one user exists in a user network and a provider network. In order to increase line bandwidth, increase transportation distance, and so on, it is needed to bond these access lines or physical ports.

Figure 8:
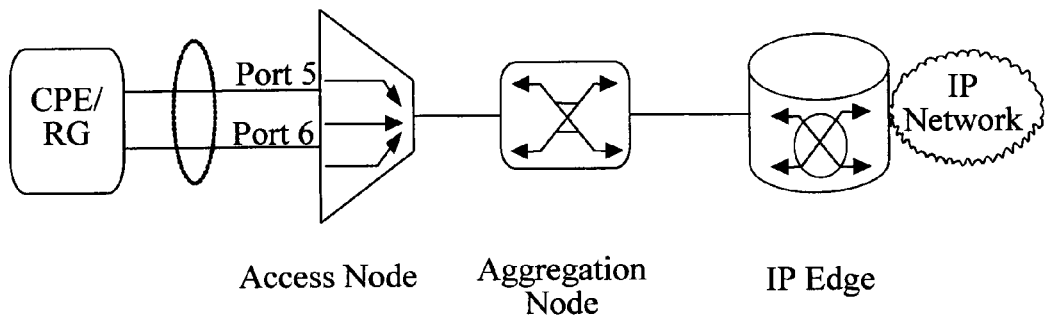
FIG. 8 is a schematic diagram of one application scenario according to an embodiment of the present invention.

In FIG. 8, a Customer Premise Equipment (CPE) or RG of a User 1 is accessed onto a Port 5 and a Port 6 of an AN through two uplink ports respectively. Physical ports Port 5 and Port 6 may locate on the same circuit board or different circuit boards. In this way, for the User 1, both physical ports Port 5 and Port 6 need to be bonded together in a network.

Figure 9:
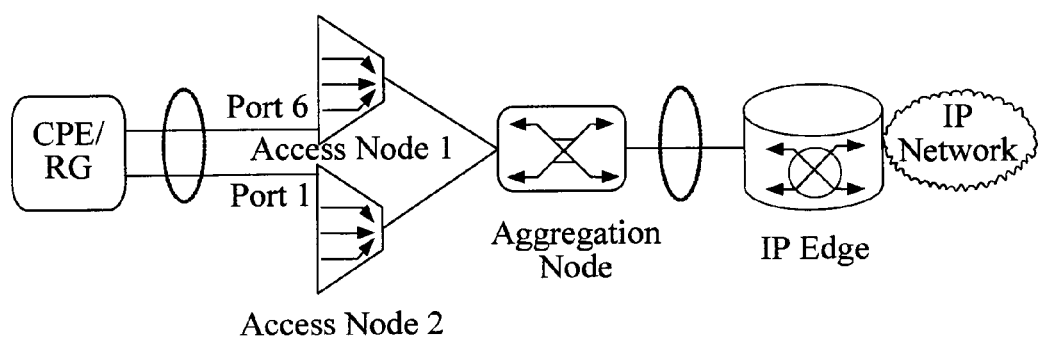
FIG. 9 is a schematic diagram of one application scenario according to an embodiment of the present invention.

In FIG. 9, the device CPE or RG of a User 2 is accessed onto two different ANs through two uplink ports respectively. Physical ports corresponding to the two ANs are on a Port 6 of an AN 1 and a Port 1 of an AN 2 respectively. In this way, for the User 2, the Port 6 of the AN 1 and the Port 1 of the AN 2 need to be bonded together in a network.

Figure 10:
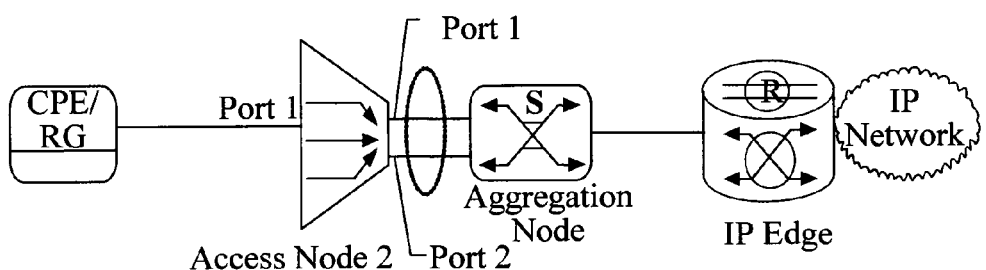
FIG. 10 is a schematic diagram of one application scenario according to an embodiment of the present invention.

For example, in FIG. 10, a User 3 is connected to two physical ports of an Aggregation Node through uplink physical ports Port 1 and Port 2 of an AN respectively. In this way, for the User 3, the Port 1 and the Port 2 of the AN need to be bonded together in a network. Multiple physical ports corresponding to one user may also exist on the Aggregation Node and an IP Edge. For this case, because physical interface bandwidth is large enough to satisfy session needs of a single user, it can be realized in a manner of link aggregation (802.3ad).

Figure 11:
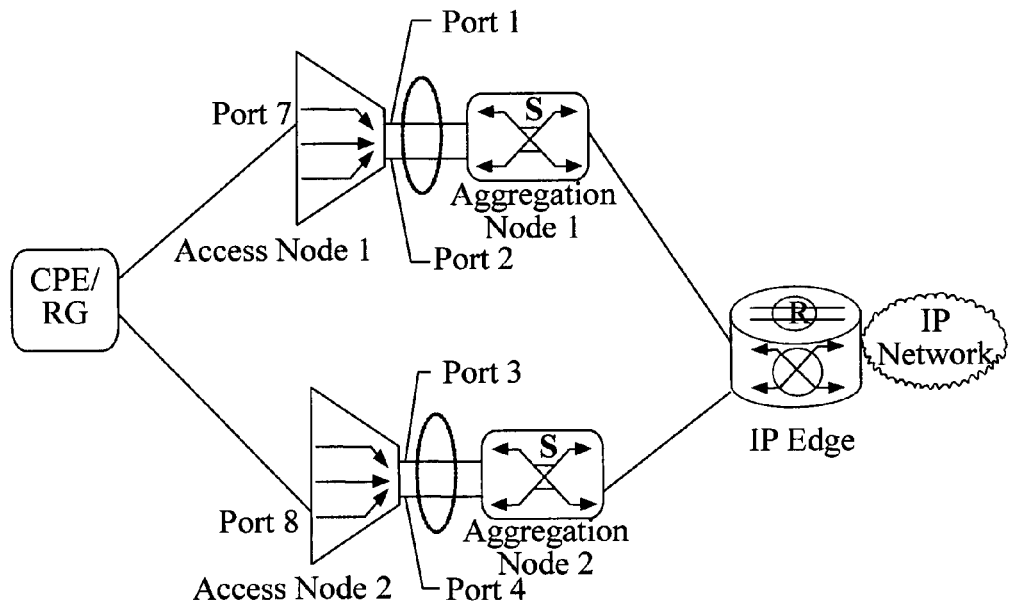
FIG. 11 is a schematic diagram of one application scenario according to an embodiment of the present invention.

For example, in FIG. 11, it is a hybrid scenario. With respect to a user, two physical ports (such physical ports as a Port 7 of an AN 1 and a Port 8 of an AN 2) can be bonded together, and four physical ports (Port 7+Port 1, Port 7+Port 2, Port 8+Port 3, and Port 8+Port 4) can also be bonded. Bonding of two ports does not care for bonding of the Port 1 and the Port 2 of the AN 1 and bonding of the Port 3 and the Port 4 of the AN 2, and the bonding of the two ports belongs to another bonding system.

Figure 12:
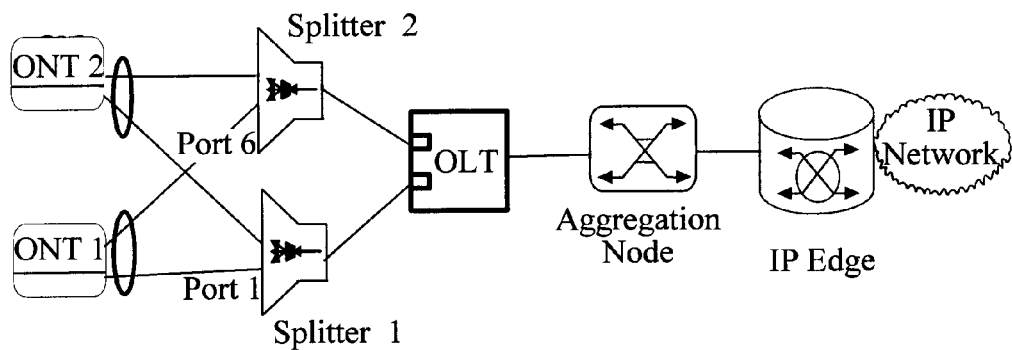
FIG. 12 is a schematic diagram of one application scenario according to an embodiment of the present invention.

For example, in FIG. 12, a User of an Optical Network Terminal (ONT) 1 links onto different optical modules of an Optical Line Terminal (OLT) through different splitters (splitter 1 and splitter 2). For the User, a Port 1 of the splitter 1 and a Port 6 of the splitter 2 need to be bonded together in a network. A bonding module of a network side can locate on an OLT, an Aggregation Node, or an IP Edge.

Figure 13:
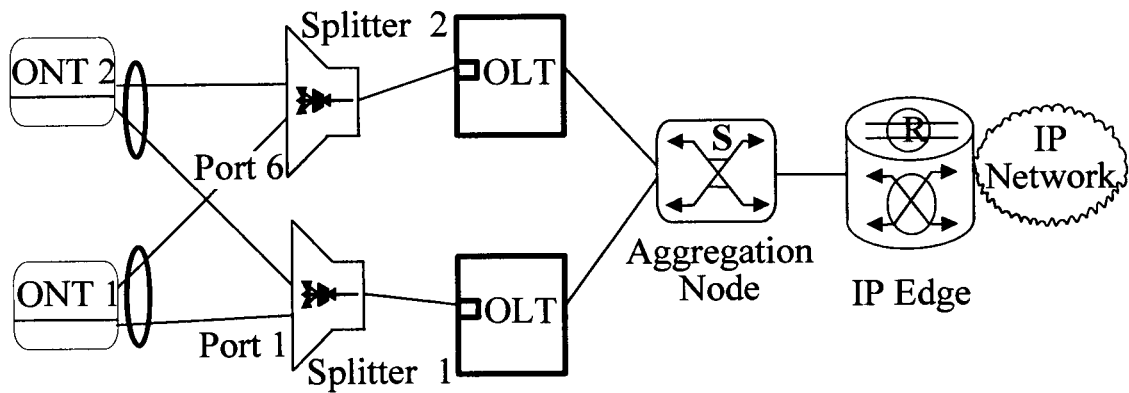
FIG. 13 is a schematic diagram of one application scenario according to an embodiment of the present invention.

For example, in FIG. 13, a User of an ONT 1 links onto different OLTs through different splitters (splitter 1 and splitter 2). For the User, a Port 1 of the splitter 1 and a Port 6 of the splitter 2 need to be bonded together in a network. A bonding module of a network side may locate on an Aggregation Node or an IP Edge.

According to this embodiment, a method and system which adopt an L2 Tunnel technology are provided to realize session bonding for cross-device or cross-circuit board Ethernet link layer, which can realize that line traffic on different devices and different circuit boards are dynamically scheduled and a device between MUX/DeMUX modules transparently transports bonded data, so as to increase line transportation bandwidth, prolong transmission distance, and improve the reliability.

In this method and system, at least one network-side bonding module (network-side MUX/DeMUX module) and one user-side bonding module are included. The network-side MUX/DeMUX module can locate on an IP Edge or L2C (L2C refers to a layer 2 control protocol, such as ANCP of IETF and L2CM of DSL Forum) proxy device. One system can have one or more network-side MUX/DeMUX modules, for example, one centralized network-side MUX/DeMUX module or multiple network-side MUX/DeMUX modules distributing at an AN. The user-side MUX/DeMUX module locates on an aggregation device a bonded line of which is close to a user side, such as on an RG/CPE of a user. User data is transported through a tunnel between two modules.

Tunnel information of the network-side bonding module can be statically configured and can also be dynamically generated. For example, tunnel configuration information of user equipment is configured through an Automatic Configuration Server (ACS). User related information (such as physical port and user identifier) can be acquired from a policy server or authentication server. User access line and access line physical port information (such information as service type, access line encapsulating, MTU, and line rate) can be acquired from BRAS or acquired according to L2C state report information.

A tunnel can be established between a device at which the network-side MUX/DeMUX module locates and a device at which the user-side MUX/DeMUX module locates, and the tunnel can also be established between the device at which the network-side MUX/DeMUX module locates and a provider edge device (such as an AN).

In a case of establishing the tunnel between the provider edge device and the network-side MUX/DeMUX module, the IP Edge or L2C proxy device at which the network-side MUX/DeMUX module locates allocates different tunnel information to different access physical ports of a certain bonded user through the L2C, and one access physical port can be allocated with one or more tunnel identifiers. One tunnel corresponds to one physical port of the bonded user. The network-side MUX/DeMUX module can perform aggregation or separated scheduling on the same session on different lines according to bonded physical ports, user information, tunnel information, and state information of each bonded line. For example, the RG has two uplink lines, and a provider device at which a network-side MUX/DeMUX unit (MUX/DeMUX module on the right of the drawing) locates allows to establish a tunnel relation between a device of the provider itself and the provider device only. The AN transports data that conforms to the configuration information of a certain access physical port to the network-side MUX/DeMUX unit through the tunnel.

In a case of establishing the tunnel between the user-side MUX/DeMUX module and the network-side MUX/DeMUX module, information (such as RG uplink physical port information) of the device at which the user-side MUX/DeMUX module locates can be configured on the device at which the network-side MUX/DeMUX module locates. The network-side MUX/DeMUX module performs bonding only when the user is valid and related configuration information and tunnel information can be identified. For example, two uplink ports of the user-side MUX/DeMUX module each establish a tunnel with the network-side MUX/DeMUX module, and the user data is forwarded in two tunnels. Two MUX/DeMUX modules perform aggregation and separation on data frames, but other devices do not participate in the aggregation and separation.

According to the embodiments of the present invention, one session can be transported in multiple physical lines, and user bonding is transparent for other devices other than the devices at which the bonding modules locate, so as to protect existing line investment of the provider, and improve line transportation ability.

Figure 14:
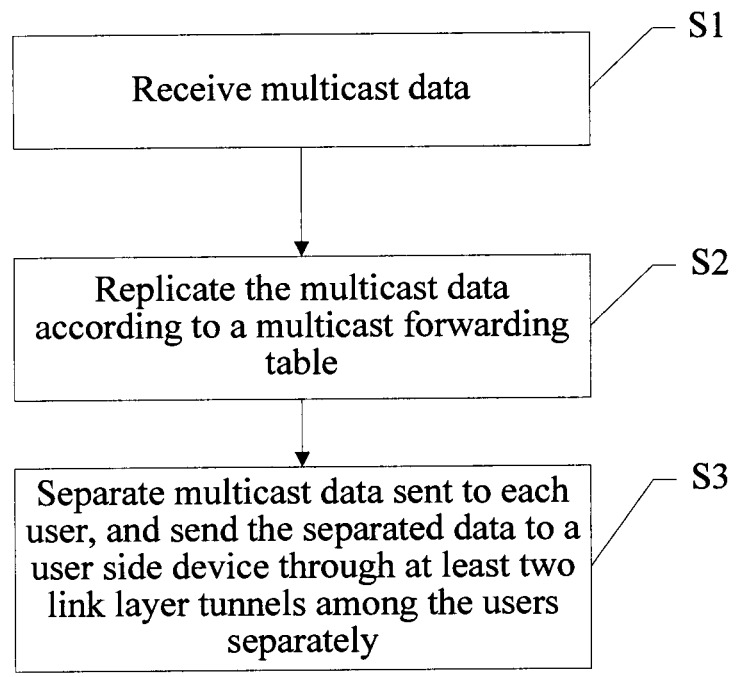
FIG. 14 is a flow chart of a data multicast method according to a third embodiment of the present invention.

In a third embodiment, FIG. 14 is a flow chart of a data multicast method. As shown in FIG. 14, the method includes the following steps:

Step S1: Receive multicast data.

Step S2: Replicate the multicast data according to a multicast forwarding table.

Step S3: Separate multicast data sent to each user, and send the separated data to a user-side device through at least two tunnels in link layer among the users separately.

It can be understood that, the user-side device receives the separated multicast data through the at least two tunnels in link layer, and reassembles the data into complete multicast data to recover the data.

The multicast method according to this embodiment is actually equivalent to repetition of multiple data transmission processes according to the first embodiment, is different only in that, a sender is one network node, while a receiver is multiple network nodes. A tunnel among multiple receivers and a corresponding data forwarding table need to be configured for the sender.

Following describes a specific scenario in which the multicast method according to the embodiment of the present invention is applied.

Figure 15:
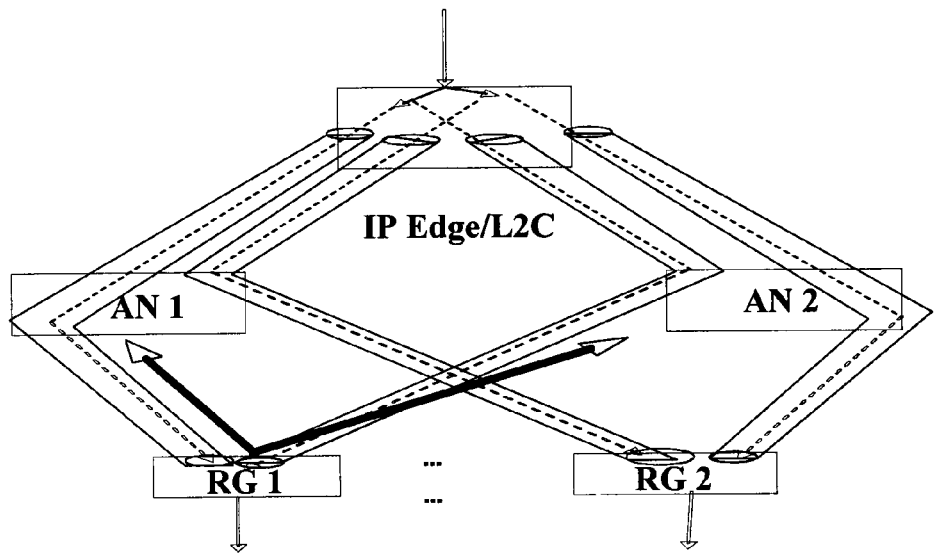
FIG. 15 is a schematic diagram of transporting multicast data in a tunnel in a bonding scenario.

FIG. 15 is a schematic diagram of transporting multicast data in a tunnel in a bonding scenario.

As shown in FIG. 15, an RG1, an RG2 . . . access to an AN 1 and an AN 2 through multiple access lines. Each RG establishes multiple tunnels through different access lines and between network-side bonding modules on an IP Edge or L2C Proxy. A network-side MUX/DeMUX module establishes a user bonding multicast distribution table for IGMP requests received from the tunnels according to whether the tunnels belong to the same user. For downlink multicast data, a multicast stream is replicated according to a multicast forwarding table, and a stream of each user is mapped according to a tunnel relation. For a multicast stream transported in multiple tunnels, it is needed to separate multicast data and transport it to a user front end device (such as RG, CPE, and ONT) through a tunnel in a unicast form.

Figure 16:
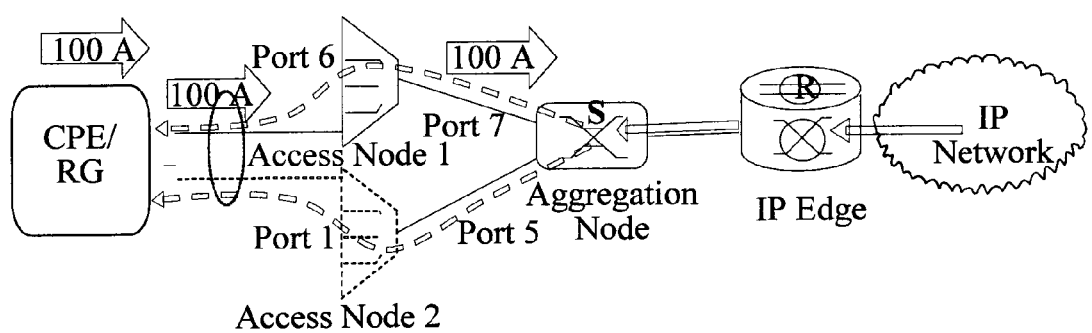
FIG. 16 is a reference view of describing a multicast process in a bonding scenario.

Description of a multicast process refers to FIG. 16 and the following description.

A host sends an IGMP request into a certain multicast group A (such as 224.1.5.6).

An RG performs tunnel mapping on an IGMP message, and transport it to an aggregation node of a network-side bonding device through the tunnel.

As shown in FIG. 16, the RG maps the IGMP message (which carries VLAN100, and a multicast address of which is A) into the tunnel through the AN 1, and transports it onto the aggregation node (a device at which an MUX/DeMUX module locates) through the tunnel. If the RG is a layer 2 device, it has an IGMP snooping function. If the RG is a layer 3 device, it has an IGMP Proxy function.

The network-side bonding device (the device at which an MUX/DeMUX module locates) forms a multicast forwarding table for the IGMP messages received from different physical ports and tunnels through the IGMP snooping or IGMP Proxy function.

The network-side bonding device knows different tunnels belonging to the same bonded user according to configuration information. If the multicast forwarding table has information of a bonded tunnel, a bonding multicast distribution table of a corresponding tunnel user is formed. The multicast forwarding table and the bonding multicast distribution table as shown in FIG. 16 are tables formed by this example.

The network-side bonding device receives a downlink multicast stream, and replicates multiple multicast streams to corresponding ports and bonded tunnels according to the multicast forwarding table.

If a bonded tunnel exists, a network side device maps a multicast data tunnel and then separates it according to the bonding multicast distribution table. A network-side bonding device divides the downlink multicast stream into multiple branch multicast streams according to a set rule, and only combination of these branch multicast streams can compose one complete multicast stream. Each branch multicast stream is sent to different tunnels of a bonded user each. As shown in the drawing, downlink streams in two dashed lines are branch multicast streams in two tunnels of a multicast stream.

The RG combines downlink multicast data from different network-side ports into one complete multicast stream and sends it to a request user.

Persons of ordinary skill in the art may understand that all or part of the steps of the method according to the embodiments of the present invention may be implemented by a program instructing relevant hardware. The program may be stored in a computer readable storage medium. The storage medium may be a magnetic disk, a Compact Disk Read-Only Memory (CD-ROM), a Read-Only Memory (ROM) or a Random Access Memory (RAM).

Following describes a network node according to the present invention in detail.

Figure 17:
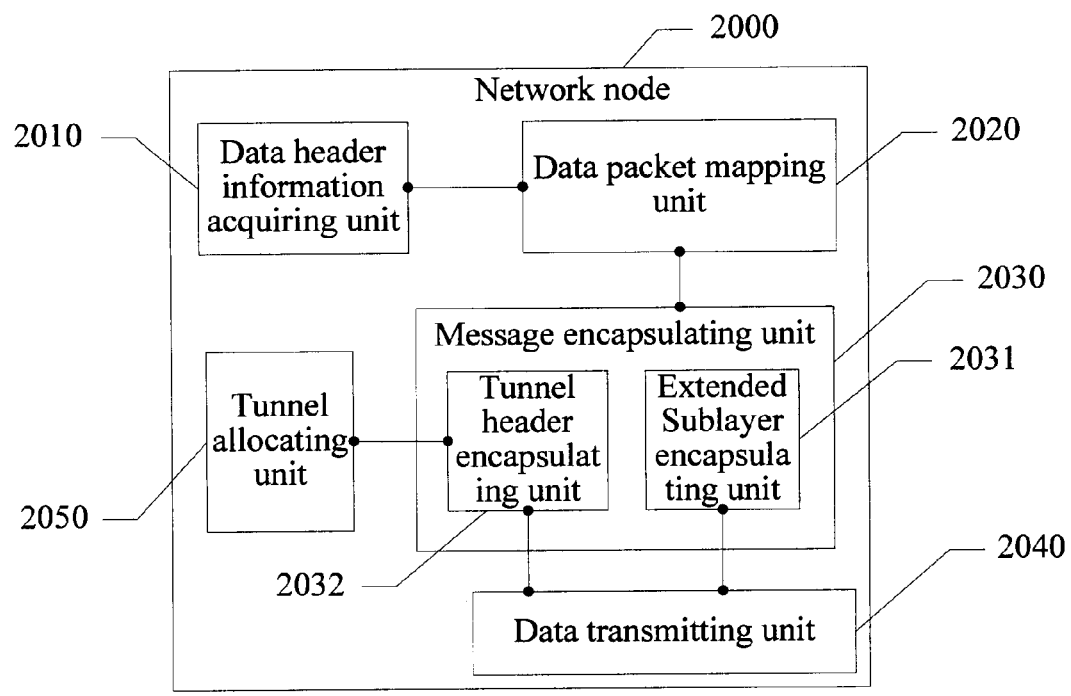
FIG. 17 is a schematic structural view of a network node according to a fourth embodiment of the present invention.

In a fourth embodiment, FIG. 17 is a schematic structural view of a network node 2000. As shown in FIG. 17, the network node 2000 includes a data header information acquiring unit 2010, a data packet mapping unit 2020, a message encapsulating unit 2030, and a data transmitting unit 2040.

The data header information acquiring unit 2010 is configured to acquire data header information of a data packet.

The data packet mapping unit 2020 is configured to map an acquired data packet to one session of multiple different sessions according to the data header information of the data packet acquired by the data header information acquiring unit.

The message encapsulating unit 2030 is configured to encapsulate the acquired data packet into a session message. The encapsulated session message includes the session identifier of the session corresponding to the one or more data packets.

The data transmitting unit 2040 is configured to transmit multiple session messages belonging to the same session through at least two tunnels in link layer.

It can be understood that, the message encapsulating unit 2030 can further include an Extended Sublayer encapsulating unit 2031, which is configured to add an Extended Sublayer to the data packet. The Extended Sublayer is encapsulated with the session identifier of the session corresponding to the one or more data packets.

The Extended Sublayer information includes the session identifier denoting the session corresponding to the one or more data packets. When a network node reached by the data packet to which the session identifier is provided needs to reassemble data packets, the network node reassembles data packets in the session messages belonging to the same session according to the session identifier.

It can be understood that, the network node according to this embodiment can further include a tunnel allocating unit 2050, which is configured to allocate a transmission tunnel for the data packet according to tunnel bandwidth utilization; and send allocated tunnel information to the message encapsulating unit 2030.

The message encapsulating unit 2030 further includes a tunnel header encapsulating unit 2032, which is configured to encapsulate a tunnel header for the data packet according to the tunnel information allocated for the data packet by the tunnel allocating unit.

The data transmitting unit 2040 sends the data packet through a corresponding link layer tunnel according to the tunnel header encapsulated by the data packet.

Figure 18:
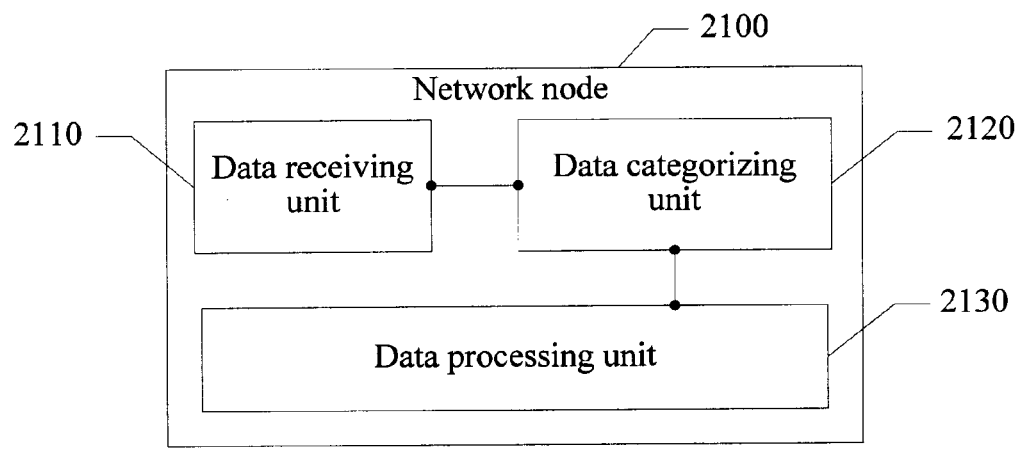
FIG. 18 is a schematic structural view of a network node according to a fifth embodiment of the present invention.

In a fifth embodiment, FIG. 18 is a schematic structural view of a network node 2100. As shown in FIG. 18, the network node 2100 includes a data receiving unit 2110, a data categorizing unit 2120, and a data processing unit 2130.

The data receiving unit 2110 is configured to receive session messages through at least two tunnels. Each received session message is encapsulated with a data packet and a session identifier.

The data categorizing unit 2120 is configured to categorize the session messages according to the session identifiers of the received session messages.

The data processing unit 2130 is configured to reassemble data packets in the session messages belonging to the same session.

Figure 19:
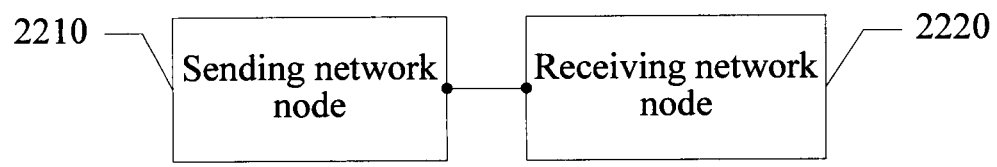
FIG. 19 is a schematic structural view of a data transmission system according to a sixth embodiment of the present invention.

In a sixth embodiment, FIG. 19 is a schematic structural view of a data transmission system. As shown in FIG. 19, the data transmission system includes a sending network node 2210 and a receiving network node 2220.

The sending network node 2210 is configured to map multiple acquired data packets to different sessions according to data header information of data packets, in which each session corresponds to one or more data packets; encapsulate a data packet into a session message, in which the encapsulated session message includes a session identifier of the session corresponding to the one or more data packets; and transmit multiple session messages belonging to the same session to a next network node through at least two tunnels in link layer.

The receiving network node 2220 is configured to receive session messages through at least two tunnels, in which each received session message is encapsulated with a data packet and a session identifier; categorize the session messages according to the session identifiers of the received session messages; and reassemble data packets in the session messages belonging to the same session.

In the foregoing, the data transmission method, the network node and the data transmission system according to the embodiments of the present invention are described in detail. Specific examples are applied in this detailed description to set forth principles and implementation manners of the present invention, and illustration of the foregoing embodiments is only used to help understand the method and the core idea of the present invention. Meanwhile, persons having ordinary skill in the art can make variations and modifications to the present invention in terms of specific implementations and application scopes according to the ideas of the present invention. Therefore, the embodiments in the specification shall not be construed as limitations to the present invention.

What is claimed is:

1. A data transmission method, for transmitting multiple data packets, comprising:

replacing, by a remote gateway, a source Media Access Control (MAC) address, a source Internet Protocol (IP) address and a destination MAC address of each received data packet with a MAC address, an IP address of the remote gateway and a MAC address of an IP Edge respectively;

mapping, by the remote gateway, multiple received data packets to different sessions according to data header information-of the data packets, wherein each session corresponds to one or more data packets;

encapsulating, by the remote gateway, a data packet into a session message, wherein the encapsulated session message comprises a session identifier of the session corresponding to the one or more data packets and a sequence number dedicated for the session message;

allocating, by the remote gateway, a transmission tunnel for a data packet according to tunnel bandwidth utilization;

encapsulating, by the remote gateway, the transmission tunnel for the data packet; and transmitting, by the remote gateway, multiple session messages belonging to the same session to a next network node through at least two tunnels simultaneously in link layer based on transmission tunnels of the data packets encapsulated in the multiple session messages;

wherein the encapsulating the data packet into the session message comprises: adding an Extended Sublayer to the data packet, and the session identifier and the sequence number are encapsulated in the Extended Sublayer or encapsulated in label information outside the Extended Sublayer;

wherein if a sum of length of the Extended Sublayer and length of the data packet exceeds data packet length allowed to be transmitted by a network, the data packet is divided, and a process of encapsulating the data packet into the session message comprises: adding an Extended Sublayer to the divided data packet, wherein the Extended Sublayer is encapsulated with the session identifier of the session corresponding to the one or more data packets, the sequence number dedicated for the session message and division information, and the division information denotes that the data packets are reassembled and sorted.

2. The method according to claim 1, wherein if the data packet is a link layer data packet, a process of adding the Extended Sublayer to the data packet comprises:

adding the Extended Sublayer or adding the Extended Sublayer and the label information outside the Extended Sublayer to a frame header of a link layer of the data packet; or, adding the Extended Sublayer or adding the Extended Sublayer and the label information outside the Extended Sublayer to a message header of a network layer of the data packet; and if the data packet is a network data packet, the process of adding the Extended Sublayer to the data packet comprises:

adding the Extended Sublayer or adding the Extended Sublayer and the label information outside the Extended Sublayer to a frame header of the network layer of the data packet.

3. The method according to claim 1, wherein the process of transmitting, by the remote gateway comprises:
judging, by the remote gateway, whether bandwidth of one data channel of the at least two tunnels is sufficient to transmit multiple data packets corresponding to the same session and transmitting, by the remote gateway, the multiple session messages belonging to the same session to a next network node through at least two tunnels simultaneously in link layer based on transmission tunnels of the data packets encapsulated in the multiple session message if the bandwidth of the at least two tunnels is not sufficient.

4. A remote gateway, comprising:
a data header information acquiring unit, configured to acquire data header information of a data packet;
a data packet mapping unit, configured to map an acquired data packet to one session of multiple different sessions according to the data head information of the data packet acquired by the data header information acquiring unit;
a message encapsulating unit, configured to encapsulate the acquired data packet into a session message, wherein the encapsulated session message comprises a session identifier of a session corresponding to the one or more data packets and a sequence number dedicated for the session message;
a tunnel allocating unit, configured to allocate a transmission tunnel for the data packet according to tunnel bandwidth utilization; and send allocated tunnel information to the message encapsulating unit;
wherein the message encapsulating unit further comprises: a tunnel header encapsulating unit, configured to encapsulate a tunnel header for the data packet according to the tunnel information allocated for the data packet by the tunnel allocating unit; and
a data transmitting unit, configured to transmit multiple session messages belonging to the same session through at least two tunnels simultaneously in link layer based on tunnel headers of the data packets encapsulated in the multiple session messages;
wherein the data transmitting unit is configured to transmit multiple session messages belonging to the same session through at least two tunnels simultaneously in link layer based on tunnel headers of the data packets encapsulated in the multiple session messages if it is determined that bandwidth of one data channel of the at least two tunnels is not sufficient to transmit the multiple data packets corresponding to the same session.

5. A data transmission system, comprising:
a remote gateway, configured to replace a source Media Access Control (MAC) address, a source Internet Protocol (IP) address and a destination MAC address of each received data packet with a MAC address, an IP address of the remote gateway and a MAC address of an IP Edge respectively, map multiple acquired data packets to different sessions according to data header information of the data packets, wherein each session corresponds to one or more data packets; encapsulate a data packet into a session message, wherein the encapsulated session message comprises a session identifier of a session corresponding to the one or more data packets and a sequence number dedicated for the session message; allocate a transmission tunnel for a data packet according to tunnel bandwidth utilization; encapsulate the transmission tunnel for the data packet; and transmit multiple session messages belonging to the same session to a next network node through at least two tunnels simultaneously in link layer based on transmission tunnels of the data packets encapsulated in the multiple session messages; and
a receiving network node, configured to receive session messages through at least two tunnels, wherein each received session message is encapsulated with a data packet, a session identifier and a sequence number dedicated for the session message; categorize the session messages according to the session identifiers of the received session messages; and reassemble data packets in the session messages belonging to the same session according to the sequence numbers;
wherein the encapsulate the data packet into the session message comprises: adding an Extended Sublayer to the data packet, and the session identifier and the sequence number dedicated for the session message are encapsulated in the Extended Sublayer or encapsulated in label information outside the Extended Sublayer;
wherein if a sum of length of the Extended Sublayer and length of the data packet exceeds data packet length allowed to be transmitted by a network, the data packet is divided, and
a process of encapsulating the data packet into the session message comprises: adding an Extended Sublayer to the divided data packet, wherein the Extended Sublayer is encapsulated with the session identifier of the session corresponding to the one or more data packets, the sequence number dedicated for the session message and division information, wherein the division information denotes that the data packets are reassembled and sorted.

6. The system according to claim 5, wherein
if the data packet is a link layer data packet, a process of adding the Extended Sublayer to the data packet comprises:
adding the Extended Sublayer or adding the Extended Sublayer and the label information outside the Extended Sublayer to a frame header of a link layer of the data packet; or, adding the Extended Sublayer or adding the Extended Sublayer and the label information outside the Extended Sublayer to a message header of a network layer of the data packet; and
if the data packet is a network data packet, the process of adding the Extended Sublayer to the data packet comprises:
adding the Extended Sublayer or adding the Extended Sublayer and the label information outside the Extended Sublayer to a frame header of the network layer of the data packet.

7. The system according to claim 5, wherein the process of transmitting multiple session messages comprises:
transmitting multiple session messages belonging to the same session through at least two tunnels simultaneously in link layer based on tunnel headers of the data packets encapsulated in the multiple session messages if it is determined that bandwidth of one data channel of the at least two tunnels is not sufficient to transmit the multiple data packets corresponding to the same session.

* * * * *